(12) United States Patent
Barbosa

(10) Patent No.: US 8,753,590 B2
(45) Date of Patent: *Jun. 17, 2014

(54) PURIFICATION OF METALS

(71) Applicant: Mallinckrodt LLC, Hazelwood, MO (US)

(72) Inventor: Luis Antonio Miguel Marques Barbosa, Alkmaar (NL)

(73) Assignee: Mallinckrodt LLC, Hazelwood, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/676,219

(22) Filed: Nov. 14, 2012

(65) Prior Publication Data

US 2013/0171046 A1    Jul. 4, 2013

Related U.S. Application Data

(63) Continuation of application No. 12/676,197, filed as application No. PCT/US2008/075759 on Sep. 10, 2008, now Pat. No. 8,318,113.

(30) Foreign Application Priority Data

Sep. 10, 2007 (GB) .................................. 0717612.6

(51) Int. Cl.
    *C01F 13/00* (2006.01)
(52) U.S. Cl.
    USPC ........ 423/2; 423/22; 423/49; 423/54; 423/89; 423/139; 210/660; 210/679; 252/184
(58) Field of Classification Search
    USPC ..................... 423/2, 22, 49, 54, 89, 139, 274; 210/660, 679; 252/184
    See application file for complete search history.

(56) References Cited

U.S. PATENT DOCUMENTS

| | | | |
|---|---|---|---|
| 4,094,953 A | 6/1978 | Hadi et al. | |
| 4,383,980 A | 5/1983 | Dines | |
| 4,391,714 A | 7/1983 | Preisler et al. | |
| 5,508,010 A | 4/1996 | Sameh et al. | |
| 8,318,113 B2 * | 11/2012 | Barbosa ............................ | 423/2 |

FOREIGN PATENT DOCUMENTS

| | | |
|---|---|---|
| DE | 2755783 | 7/1979 |
| EP | 0062804 | 10/1962 |

OTHER PUBLICATIONS

Sameh, "Production of Fission Mo-99 from LEU Uranium Silicide Target Materials", 2000 Symposium on Isotope and Radiation Applications, May 2000.

Sameh et al, "Production Techniques of Fission Molybdenum-99", Radiochim. Acta, 41, 1986, pp. 65-72.

* cited by examiner

*Primary Examiner* — Steven Bos

(57) ABSTRACT

A solid composition comprises:
  $MnO_2$; and
  a compound represented by the general formula (I)

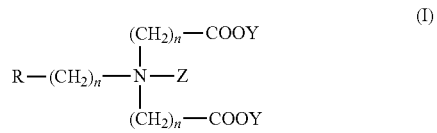

wherein:
R is a polymer;
each Y is independently a hydrogen or a negative charge;
Z is either hydrogen or is not present;
each n is independently 1, 2, 3, 4, 5 or 6;
wherein the $MnO_2$ is bound to the compound of formula (I) so as to coat the surface thereof. Such a composition may be used for the separation of polyvalent metal species, such as Mo, from one or more accompanying impurities.

20 Claims, No Drawings

PURIFICATION OF METALS

This application is a continuation of U.S. patent application Ser. No. 12/676,197 filed on Mar. 3, 2010, which is a National Stage Application of PCT/US2008/075759, filed Sep. 10, 2008, which claims the benefit of UK Application No. GB 0717612.6 filed Sep. 10, 2007, the entire disclosures of all these applications being incorporated herein by reference.

The present invention relates to the purification of metals. In particular, though not exclusively, it relates to a composition and a method for the separation of particular polyvalent metal species from one or more accompanying impurities.

The separation of the isotope Mo-99 from an aqueous solution containing a mixture of nuclear fission products may be used to illustrate the background to the present invention. Mo-99 is one of the isotopes generated as a result of nuclear fission processes involving uranium. Of all of the fission products which are generated, Mo-99 is of particular interest, since a subsequent radioactive decay product of Mo-99 is $^{99m}$Tc, which is used in medicine, e.g. for the diagnosis of organ failure and also for the treatment of tumours.

However, when dealing with the separation of a mixture of fission products containing Mo-99, it is of importance that all of the process steps are performed as rapidly and efficiently as possible as the Mo-99 isotope decays quickly. Mo-99 decays to $^{99m}$Tc with a half-life of just 66 hours. Furthermore, the physical decay characteristics of Mo-99 are such that only 88.6% of the decaying Mo-99 atoms form $^{99m}$Tc. This means that only 78% of the activity remains after 24 hours; 60% remains after 48 hours, and so on. Therefore, the yield of Mo-99 obtained is dependent upon the speed of the separation process as well as its efficiency, as the longer the process takes, the less remaining Mo-99 there will be to recover. Because of this, any improvement in the process, however seemingly slight, which can be easily incorporated into the existing separation process or which can replace existing process steps is, therefore, of great commercial interest.

The process currently used for the separation of Mo-99 from other fission products is described in U.S. Pat. No. 5,508,010 and Sameh (Production of Fission Mo-99 from LEU Uranium Silicide Target Materials, *Invited Papers on 2000 Symposium on Isotope and Radiation Applications*, May 18-20 2000, Institute of Nuclear Energy Research, Taiwan). It involves bringing an aqueous solution of the mixture containing Mo-99 and the other fission products into contact with a packed bed of manganese dioxide ($MnO_2$). The Mo-99 (in the form of $[^{99}MoO_2]^{2+}$) is retained by the $MnO_2$ bed by means of adsorption, together with some of the other fission products, while the remainder of the unwanted fission products, together with any anionic species, are removed along with the aqueous solution.

The $MnO_2$ used in the packed bed in U.S. Pat. No. 5,508,010 has a particle size of 0.2-0.5 mm from which any finer particles have been previously removed by liquid sedimentation. This is because particles smaller than 0.2 mm are said to be able to be washed out of the column together with the unwanted fission products, while carrying some of the target Mo-99. This loss of Mo-99 attached to the small $MnO_2$ particles decreases the final yield of Mo-99.

The mixture of fission products containing the Mo-99 is added to the $MnO_2$ packed bed in a solution of 3M nitric acid, or 2M sodium nitrate and 1M nitric acid. After the mixture is completely added, the column is washed with more nitric acid and water.

The $MnO_2$ packed bed containing the adsorbed Mo-99 is dissolved in a 2M sulphuric acid solution containing $SCN^-$, $SO_3^{2-}$ and $I^-$ ions. The resultant solution is then run through a column of Chelex® 100 (which is a chelate-forming ion-exchanger based on a styrene-divinylbenzene copolymer having iminodiacetate groups) which has been pre-conditioned by a sulphuric acid solution containing the same ions. The charged column is then washed, in sequence, with 2M sulphuric acid containing rhodanide (i.e. thiocyanate) and sulfite ions, and then with water. Under these conditions, a molybdenum complex, $[Mo-99(SCN)_6]^{3-}$, is formed. This complex is selectively bound by the Chelex, removing it from the solution of unwanted components, and helping to remove most of any remaining impurities in the Mo-99. The final Mo-99 separation (i.e. to effect its removal from the Chelex) is performed with 1M caustic soda solution heated to 50° C. This final basifying step changes the charge on the Chelex from positive to negative, thus changing it to a cation, rather than anion, exchanger. The Mo-containing anions are thus eluted as $[MoO_4]^{2-}$, the normal form of Mo in basic solutions. A similar separation/purification approach may be employed for other polyvalent metal ions, particularly transition metal ions, exhibiting the ability to form anionic complexes in acidic solution.

Importantly, the Chelex must not come into contact with nitrates, hence the need for the $MnO_2$ packed bed, containing the Mo-99, to be washed of nitric acid prior to dissolution in sulphuric acid solution.

As mentioned above, any improvement in the design of the process which can bring about a greater efficiency in terms of speed of separation or yield is of significant commercial interest.

Therefore, in accordance with the present invention, there is provided a solid composition comprising:
$MnO_2$; and
a compound represented by the general formula (I)

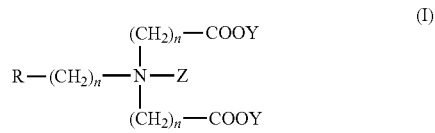

wherein:
R is a polymer;
each Y is independently a hydrogen or is not present;
Z is either hydrogen or is not present;
each n is independently 1, 2, 3, 4, 5 or 6;
wherein the $MnO_2$ is bound to the compound of formula (I) so as to coat the surface thereof.

The composition of the invention allows nitrate-rich (from nitric acid) eluates from Mo-99 generators, or other isotope production processes, to be loaded directly into a vessel containing the composition. The $MnO_2$ coating effectively shields the compound of formula I from the nitrates. The Mo-99, or other desired metal, can thus be adsorbed onto the $MnO_2$, and the nitrate solution washed away. The subsequent exposure of the compound of formula I (as described in more detail below), allows the further purification of the Mo-99, or other desired metal, in the same vessel. The ability to perform the separation/purification in a 'one-shot/one-pot' manner leads to improvements in efficiency and/or yield for all polyvalent metal ions amenable to separation using the $MnO_2$/Chelex approach, regardless of whether the input material containing the desired metal is rich in nitrates or not.

In certain embodiments of the invention, the coating of the compounds of formula I with $MnO_2$ is substantially complete. It is preferred that at least 50% of the surface of the compounds of formula I is coated with $MnO_2$, more preferably at least 60%, even more preferably at least 75%, most preferably at least 90%.

Although R may be a homopolymer, it is preferably a copolymer. Preferred polymers for use in compositions of the invention are hydrophobic polymers, in some instances containing aromatic groups (such as phenyl groups) within their structure. Included amongst the monomers which may form the homopolymer or part of the copolymer R are styrene, divinylbenzene, and derivatives thereof. In certain embodiments, R is a copolymer of styrene and divinylbenzene. Preferably, R is a crosslinked polystyrene, which may be formed by the addition of a quantity (for example, 0.5-25%) of a crosslinking agent, such as divinylbenzene, to styrene during polymerisation.

While the variable n may in each instance independently represent any integer from 1-6, n may be the same integer (1, 2, 3, 4, 5 or 6) in each case, and is preferably 1 in each case.

It is the COOY groups in the compound of formula (I) which are important in the chelation of polyvalent metal ions, such as Mo-99. The most preferred compounds of formula (I) are Chelex® 100 or Chelex® 20 (most preferably Chelex® 100), which are styrene-divinylbenzene copolymers bearing iminodiacetate groups. Such compounds exhibit levels of selectivity for divalent metal ions over monovalent metal ions of about 5,000 to 1, and the levels of selectivity remain high even in highly concentrated salt solution.

Chelating resins such as Chelex® 100 or Chelex® 20 are available as Analytical Grade Chelex 100 resin, Biotechnology Grade Chelex 100 resin, and Technical Grade Chelex 20 resin. Biotechnology Grade Chelex 100 resin is analytical grade resin which is certified to contain less than 100 microorganisms per gram of resin. Technical Grade Chelex 20 resin is a coarse mesh resin. In principle both Chelex 20 and Chelex 100 can be used in compositions of the invention. Chelex 20 has a lower degree of purification, however, and has a larger particle size (20-50 mesh, i.e. around 0.85-0.3 mm) and is hence less preferred. It is potentially more advantageous to use Chelex 100 of particle size 100-200 mesh (approximately 0.15-0.075 mm) or 200-400 mesh (approximately 0.075-0.037 mm) in compositions of the present invention.

Chelex resins are classed with the weakly acidic cation exchange resins due to the presence of the carboxylic acid groups, but they differ from ordinary exchangers because of the high selectivity for metal ions and much greater bond strength. They operate mostly in basic, neutral, and weakly acidic solutions of pH 4 or higher. At very low pH, the resin acts as an anion exchanger. The structure of the Chelex varies with pH. For example, at a pH of about 2, Y=H and Z=H (i.e. the nitrogen atom is positively charged). At more weakly acidic pHs, such as 4, one of the COOY groups of the iminodiacetate groups is deprotonated to form a zwitterionic structure. At a neutral pH, both the COOY groups of the iminodiacetate groups are deprotonated, and at a basic pH, the nitrogen atom is also deprotonated.

The composition of the invention can act both as a cationic exchanger (both when the $MnO_2$ is present and also subsequent to removal of the $MnO_2$ and once the pH is raised (due to the $COO^-$ groups of the compound of formula (I) thereby formed)), and also as an anionic exchanger (due to the compound of formula (I)), following the dissolution of the $MnO_2$ in an acidic medium. It can therefore also be used in other applications where the desired metal species can shift from cationic to anionic species in acidic media. The composition of the invention can be used to bind any cationic species from solution. It has an additional advantage, however, of being able to separate different cations upon chemical transformation of one of the cationic species in acid media (i.e. an alteration in complexation or oxidation state) because the transformed species can then be captured by an anionic exchanger (i.e. the compound of formula I, such as Chelex, which remains). Additionally, compounds of formula I, such as Chelex, are able to function as cationic exchangers themselves in basic media. This allows for release of the anionic transformed species by addition of base.

Although $MnO_2$ exists in a lattice structure, the $MnO_2$ has OH groups on its surface, the 'free' oxygen atoms at the surface which are only bound to one manganese atom being terminated by protons. The compound of formula (I) is able to bind to the $MnO_2$ due to the presence of these surface OH groups. The manner in which this occurs is dependent upon the precise synthetic process undertaken to prepare the composition. However, since the compound of formula I can bind to cations or anions depending on the pH of the surrounding media, the synthetic process can be relatively flexible.

The composition of the invention is preferably in particulate form.

The composition of the invention is intended to be used in the separation of polyvalent metal ions from accompanying impurities, such as the separation of Mo-99 from other fission products, in place of the pure $MnO_2$ particles which are used in the column (i.e. the packed bed) for the adsorption of Mo-99 as in U.S. Pat. No. 5,508,010. The composition of the invention is preferably presented in a column having one or more closable inlets and outlets.

The composition of the invention has the advantage that it allows the collection, in a 'one-pot, one-shot' manner, of substantially all the desired polyvalent metal ion, such as Mo-99, retained by the $MnO_2$ following the latter's dissolution. This improves the process time (which, in the case of the separation of radioactive isotopes, in turn increases the final yield of desired fission products) and reduces losses in the process due to transferring materials from one separation medium to another.

Also provided, in another aspect of the invention, is a method of separating a desired polyvalent metal species from one or more accompanying impurities, the method comprising:

(i) contacting the desired polyvalent metal species and accompanying impurities with a composition of the invention as described above and allowing the desired polyvalent metal species to bind to the composition;
(ii) dissolving the $MnO_2$ and the desired polyvalent metal species bound thereto to form a solution thereof; and
(iii) contacting the solution with a complexing agent and enabling the solution to come into contact with the compound of formula I exposed as a result of the dissolution of step (ii).

In step (ii), the $MnO_2$ (and bound desired polyvalent metal species) is preferably dissolved in sulphuric acid, such as 2M sulphuric acid.

The desired polyvalent metal species is any such species which displays the ability to selectively form anionic complexes with anionic ligands in acidic solution. The desired polyvalent metal species may be radioactive or non-radioactive. Such species include Mn, Co, Ni and Pt (which form $[M^{II}(SCN)_4]^{2-}$ species upon reduction and treatment with SCN ions), Fe, Co and Mo (which form $[M^{III}(SCN)_6]^{3-}$ species upon reduction and treatment with SCN ions or, in the case of Co, upon treatment with SCN ions without the reduction step), Sn and Pb (which form $[M^{IV}(SCN)_6]^{2-}$ species upon treatment with SCN ions), and Fe (which forms $[M^{II}(SCN)_6]^{4-}$ species upon reduction and treatment with SCN ions). In one possible application of the composition of the invention, it may be used as part of an analysis of Pb-containing solutions.

The desired polyvalent metal species is preferably a transition metal, such as Mn, Co, Ni, Pt, Fe or Mo. The desired polyvalent metal species is, in certain embodiments, a radioactive isotope. In exemplary embodiments, the desired polyvalent metal species is an isotope of Mo. In particular embodiments, the desired polyvalent metal species is Mo-99, the accompanying impurities including other fission products, e.g. from a generator eluate.

The complexing agent used in step (iii) may be any suitable mono- or multidentate ligand. In certain embodiments, the complexing agent comprises a monodentate ligand, such as rhodanide (i.e. thiocyanate) ions. The complex of Mo-99 with rhodanide is coloured, hence providing a robust test for identifying, at least qualitatively, the presence of Mo-99.

The method of the present invention may, in certain embodiments, include the addition of a reducing agent in step (iii). Mo, Mn, Pt, Co, Fe and Ni may be purified via complexation with SCN ions when reduced to the +2 (Mn, Co, Ni, Fe and Pt) or +3 (Mo and Fe) oxidation states. Complexation may, however, take place without a reduction step in the case of $Co^{III}$, $Pb^{IV}$ and $Sn^{IV}$ complexes. Accordingly, it may be appropriate to reduce the oxidation state of the desired metal species as part of step (iii). The reducing agent in step (iii) may be selected from the group consisting of iodide ions, sulphite ions, metallic zinc, metallic aluminium, and combinations thereof. In particular, a combination of iodide and sulphite ions may be used.

If a reducing agent is not required as part of step (iii), the desired polyvalent metal species may be purified by the method of the invention in the higher oxidation state suitable for complex formation.

The method of the invention is preferably carried out in one or more columns packed with the composition of the invention. The method may also employ one or more columns packed with compound of formula I for binding complexed desired polyvalent metal species, such as Mo-99, following steps (i)-(iii). Such an arrangement may increase the overall capacity of the method and increase the overall efficiency of desired polyvalent metal species recovery. Thus, in an embodiment, a first column is used which contains particles of the composition of the invention. The first column is connected to a second column such that the eluate from the first column enters the second column, the second column containing particles of compound of formula I. The particles in the first column may have a size of around 100-200 mesh, whilst the second column may contain particles of around 200-400 mesh.

The invention also provides the use of a composition of the invention as described above, in the separation of a desired polyvalent metal species from one or more accompanying impurities.

In particular embodiments, the composition of the invention is used for the separation of Mo-99 from a mixture of fission products.

The process of the invention, as used for the separation of Mo-99 from the other fission products (for the purposes of illustration) is, in overall terms, similar to that described in U.S. Pat. No. 5,508,010. It comprises bringing an aqueous solution of the mixture containing Mo-99 and the other fission products into contact with a packed bed comprising the composition of the invention. The Mo-99 (in the form of $[Mo-99O_2]^{2+}$), together with some of the other fission products, is retained by the packed bed comprising the composition by means of adsorption, while the remainder of the unwanted fission products is removed along with the aqueous solution.

The composition of the invention with the adsorbed Mo-99 is then treated with an acid solution (such as sulphuric acid) containing $SCN^-$, $SO_3^{2-}$ and $I^-$ ions, as in U.S. Pat. No. 5,508,010, to dissolve the $MnO_2$ and the adsorbed Mo-99. Again, a complex of $[Mo-99(SCN)_6]^{3-}$ is formed. However, whereas the process described in U.S. Pat. No. 5,508,010 requires a further step of separating out the $[Mo-99(SCN)_6]^{3-}$ complex using a column comprising a Chelex resin compound, this step is effectively combined with the previous separation step in the process of the invention. This is because of the compound of formula (I) which is initially coated with the $MnO_2$. The presence of this compound enables the $[Mo-99(SCN)_6]^{3-}$ to be retained by the composition as it is chelated by the compound of formula (I) in a similar manner to when the Mo-99 is added to the Chelex column in the process of U.S. Pat. No. 5,508,010. The use of the composition of the invention in the separation process therefore removes the need for a separate purification step using a Chelex-containing column, since the composition, comprising such a chelating agent, can carry out this function instead by selectively chelating the $[Mo-99(SCN)_6]^{3-}$ complex as it forms. The separation and purification steps are therefore effectively carried out in an integrated step. This speeds up the whole separation process, which will increase the overall yield since less of the Mo-99 will have decayed. The composition of the invention also allows the combination of two consecutive process steps, thus minimising the loss of Mo-99 even further to increase the overall yield obtained.

Following this step, the final removal of the Mo-99 from the composition of the invention can be carried out in a similar manner as in U.S. Pat. No. 5,508,010, e.g. by treatment with caustic soda solution (for example, a 1M solution), which may be heated to 50° C., although this temperature is not essential. During this final step, the $[Mo-99(SCN)_6]^{3-}$ complex is broken and the anionic $[MoO_4]^{2-}$ is formed and subsequently eluted. Any Mn from step (ii) which is not washed away but is bound to the compound of formula I, will be retained on the compound of formula I following the final step. The separation of Mo from any contaminating Mn is thus effected. Some of the other metals mentioned herein may form precipitates during the final basifying step. However, these metals may still be eluted from the compound of formula I by repeated washing with base.

It will be appreciated that this process may be employed for the purification of other desired polyvalent metal species, by means of the selective formation of anionic complexes in acidic solution, allowing the chelation thereof by the exposed Chelex. It will further be understood that the method and composition of the present invention cannot be used to separate polyvalent metal species having similar complexation behaviour from each other. However, the method and composition may readily be used to separate such metal species from other contaminating components that may be present.

When the composition is in particulate form, the particles of the composition may be of any size, but are preferably between about 0.1 mm and 0.5 mm in size. While the particle size of the $MnO_2$ is an important factor to be considered to minimise loss of the smaller particles during the process described in U.S. Pat. No. 5,508,010, it is not a major factor in the composition or process of the invention. In the invention, the $MnO_2$ is chemically bound to the compound of formula I (e.g. as a coating on particles of compound of formula I). This avoids the problem of the loss of the smaller $MnO_2$ particles seen during the washing of the prior art $MnO_2$ columns. In some embodiments of the invention, however, the particles of the composition, contained in a column for example, are washed prior to the addition of the fission products to eliminate any small and/or loose particles of $MnO_2$, such as those of about 0.1 mm in size or less, via a process such as liquid sedimentation. This involves forming a slurry and allowing the sedimentation, where the liquid used to form the slurry carries the fine particles on or near its surface, this portion of the liquid then being removed.

An alternative means of removing loose particles of $MnO_2$, or excessively fine particles of the composition, is to fill the column with wet sedimented composition such that the column is flooded with water, and then to blow air through the column from the bottom for a short period. This can be carried out more than once, if desired.

As the $MnO_2$ coating of the particles is somewhat susceptible to abrasion during the column elution process, further fine loose particles smaller than 0.1 mm may be formed which may be removed in the same manner as described above.

In another aspect, the present invention provides an apparatus comprising a vessel, the vessel having an inlet for the introduction of a solution containing a desired polyvalent metal species, and an outlet for the elution of components of the solution, the vessel being provided with a composition of the invention as described above.

The inlet and outlet of the vessel may, in certain embodiments, be the same part of the vessel, i.e. acting as an inlet when the vessel is being charged, then acting as an outlet for discharging of the vessel. In preferred embodiments, however, the inlet and outlet are separate parts of the vessel. In particular embodiments, the vessel is in the form of a column, which may be substantially cylindrical in shape, having an inlet at one end thereof and an outlet at the other end thereof. Such a column may be connected at its inlet to the output of chemical processing equipment (e.g. processing equipment downstream of a radioisotope (e.g. Mo-99) generation facility (e.g. nuclear reactor or cyclotron), such as a chemical reactor (e.g. dissolver), conditioning vessel or a purification column), and at its outlet to a collection vessel or to further purification apparatus.

Any of the preferred or optional features of the composition or method described above may also be applied, as appropriate, to the apparatus of the invention.

The present invention will now be described in more detail by way of example only.

EXAMPLE 1

Preparation of Resin Composition of the Invention

The composition of the invention may be prepared using conventional techniques for producing $MnO_2$-adsorbates on solid materials. The method used in this Example is based on an analogous methodology for producing $MnO_2$ on alumina.

The resin composition was prepared as follows:
50 g of Chelex 100-200 mesh (available, for example, from Bio-Rad Laboratories, Inc. (Hercules, Calif.) or Sigma Aldrich) is placed into a glass beaker and mixed with 50 ml of a solution of 0.24 M $KMnO_4$, Stir the slurry thoroughly for about 30 min.
Filter the slurry and add the purple coloured Chelex into a beaker with a solution of 0.64 M $MnSO_4$ (or $MnCl_2$) pre-heated to about 90° C. Stir the slurry thoroughly for about 30 min. In the case of using $MnCl_2$, the reaction temperature can be about 20-25° C.
The slurry is then filtered and washed with demineralised water (e.g. 6-10 times).

The final material is then placed in an oven at 60-70° C., for example for about 10-15 hours.

The product resin composition can then be used according to the invention. It will be appreciated that the above recipe is designed for producing a small batch of resin composition. The process can, however, be readily scaled up to produce larger batches.

EXAMPLE 2

Purification of Mo Using a Composition of the Invention

A number of tests were performed with different samples of the resin composition of the invention, which may be prepared, for example, according to Example 1. These tests tried to simulate the prior art process purification step (described above) in which the $MnO_2$ bed is employed.

The purification using a composition of the invention is divided into four steps: loading, washing, pre-conditioning and dissolution. The presence (or absence) of Mo in the solution collected after each of these steps (except the dissolution step) was verified by inductively-coupled plasma atomic emission spectroscopy (ICP) measurements. The dissolution step was examined by a visual inspection of the disappearance of the $MnO_2$ coating layer on the Chelex and also by a visual inspection of the colouring (to a red colour, resulting from formation of the Mo-thiocyanate complex described above) of the Chelex resin, indicating the adsorption of Mo from the solution.

The same procedure was used for each test, as follows:
2 g of the resin composition of the invention [samples 1 and 2] is placed into a glass column. The loading solution is prepared by dissolving 0.073 g of $MoO_3$ in 200 ml NaOH (2M). 2 ml of the resulting solution is acidified with 2 ml $HNO_3$ (6N). 2 ml of the resulting solution is loaded into the column and the solution is collected in a 10 ml vial: Loading Solution (LS)
The column is further washed with 10 ml of a solution of $KNO_3$ (0.1M) in $HNO_3$ (2M). This solution is collected in a 10 ml vial: Washing Solution (WS)
The column is then conditioned with 3×10 ml 0.05M $K_2SO_4$. The second portion of 10 ml is collected in a 10 ml vial: Conditioning Solution (CS).
The dissolution (of the $MnO_2$ coating) is performed by flushing the material into a beaker with demineralised water, followed by the addition of a solution containing: 15 ml $H_2SO_4$ (9M), 0.2 ml KI (1M), 20 ml $Na_2SO_3$ (1M) and 5 ml $NH_4SCN$ (6M), at once into the slurry. This solution is the Dissolution Solution (DS)

Calibration solutions for the ICP measurements were prepared as follows: 250, 500, 750, 1000 and 1250 µL Stock-solution (the concentration of which was 0.1 mg/mL; prepared using Mo-standard solution 1000 µg/mL (BAKER 5769), 10 mL of Mo-standard being made up to 100 mL with 0.1 N $HNO_3$) were separately pipetted into 100 ml volumetric flasks. These were adjusted to 100 ml with 0.1N $HNO_3$. The concentrations of Mo are: 250, 500, 750, 100 and 1250 ppb in these solutions. The Mo concentration was measured at 3 wavelengths: 202.032 nm, 203.846 nm and 204.598 nm, simultaneously.

The solutions LS, WS, and CS were subjected to ICP analysis. In the case of LS, the sample was treated prior to analysis by filtration, then dilution 1:1 with 0.1M $HNO_3$.

The results of the ICP analysis and visual examination of the solutions LS, WS, CS and DS are presented in Table 1.

TABLE 1

| Resin Sample | Procedure step | | | |
|---|---|---|---|---|
| | LS | WS | CS | DS |
| 1 | absence of Mo at all wavelengths | absence of Mo at all wavelengths | absence of Mo at all wavelengths | All MnO$_2$ dissolved Chelex red-coloured |
| 2 | absence of Mo at all wavelengths | absence of Mo at all wavelengths | absence of Mo at all wavelengths | All MnO$_2$ dissolved Chelex red-coloured |

These test results illustrate the feasibility of using a resin composition of the present invention to purify suitable metals (Mo in this Example) in a 'one-pot, one-shot' manner. In particular, it is shown that the Mo is retained on the MnO$_2$-coated resin, but then transferred to and retained by the Chelex when the MnO$_2$ coating is removed. The removal of the need to conduct two separate purification steps (as in the prior art) should make the purification more efficient and therefore provide the potential for a higher yield of the desired metal species.

The invention claimed is:

1. A method for separating a polyvalent metal species from one or more accompanying impurities, comprising:
   (i) contacting the polyvalent metal species and accompanying impurities with a composition comprising MnO$_2$ and a compound of formula (I):

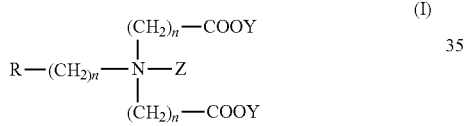

wherein:
   R is a polymer;
   each Y is independently a hydrogen or a negative charge;
   Z is either hydrogen or is not present;
   each n is independently 1, 2, 3, 4, 5 or 6; and
   wherein at least 50% of the surface of the compound of formula (I) is coated with MnO$_2$ so that the polyvalent metal binds to MnO$_2$;
   (ii) dissolving the MnO$_2$ bound to the polyvalent metal to form a solution; and
   (iii) contacting the solution with a complexing agent, so that the polyvalent metal binds to the compound of formula (I).

2. The method of claim 1, wherein the method further comprises releasing the polyvalent metal species with a base.

3. The method of claim 1, wherein the dissolution of step (ii) is facilitated with an acid.

4. The method of claim 3, wherein the acid is sulphuric acid.

5. The method of claim 1, wherein the polyvalent metal species is selected from the group consisting of Mn, Co, Ni, Pt, Mo, and Fe.

6. The method of claim 1, wherein the polyvalent metal species is Mo.

7. The method of claim 1 wherein the polyvalent metal species is a radioactive isotope.

8. The method of claim 7, wherein the polyvalent metal species is Mo-99.

9. The method of claim 1, wherein the complexing agent in step (iii) comprises rhodanide ions.

10. The method of claim 1, wherein step (iii) additionally comprises a reducing agent selected from the group consisting of iodide ions, sulphite ions, metallic zinc, metallic aluminum, and combinations thereof.

11. The method of claim 1, wherein the composition comprising MnO$_2$ and a compound of formula (I) is provided in one or more vessels having an inlet for the introduction of a solution containing the polyvalent metal species, and an outlet for the elution of components of the solution.

12. A method for separating Mo-99 from one or more accompanying impurities, comprising:
   (i) contacting the Mo-99 and the accompanying impurities with a composition comprising MnO$_2$ and compound of formula (I)

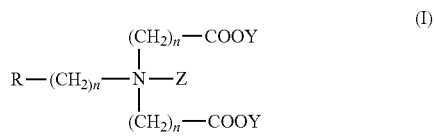

wherein:
   R is a polymer;
   each Y is independently a hydrogen or a negative charge;
   Z is either hydrogen or is not present;
   each n is independently 1, 2, 3, 4, 5 or 6;
   wherein at least 50% of the surface of the compounds of formula (I) is coated with MnO$_2$, so that Mo-99 binds to MnO$_2$ and
   (ii) dissolving the MnO$_2$ bound to the Mo-99 with an acid to form a solution;
   (iii) contacting the solution with a rhodanide complexing agent so that the Mo-99 binds to the compound of formula (I); and
   (iv) releasing the Mo-99 bound to the compound of formula (I) with a base.

13. The method of claim 12, wherein the composition comprising MnO$_2$ and a compound of formula (I) is provided in a vessel having an inlet for the introduction of a solution containing the polyvalent metal species, and an outlet for the elution of components of the solution.

14. The method of claim 12, wherein R comprises a crosslinked polystyrene and n=1.

15. A method for producing a MnO$_2$-adsorbate, wherein the method comprises contacting a manganese containing-compound chosen from KMnO$_4$, MnCl$_2$, or MnSO$_4$, to a compound represented by the general formula (I)

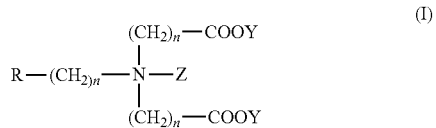

wherein:
   R is a polymer;
   each Y is independently a hydrogen or a negative charge;
   Z is either hydrogen or is not present;
   each n is independently 1, 2, 3, 4, 5 or 6; and
   wherein formula (I) is coated with MnO$_2$.

16. The method of claim 15, wherein R comprises a crosslinked polystyrene and n=1.

17. The method of claim 15, wherein the compound of formula (I) of the $MnO_2$-adsorbate is coated with $MnO_2$ on at least 50% of its surface.

18. The method of claim 15, wherein at least 90% of the surface of the compound of formula (I) is coated with $MnO_2$.

19. The method of claim 15, wherein the method further comprises heating the $MnO_2$-adsorbate at a temperature of 60-70° C.

20. The method of claim 19, wherein the heating is conducted over 10 to 15 hours.

\* \* \* \* \*